(12) United States Patent
Fischer

(10) Patent No.: US 12,239,923 B2
(45) Date of Patent: Mar. 4, 2025

(54) MIXER SYSTEM FOR A LIQUID CHROMATOGRAPHY SYSTEM

(71) Applicant: BUERKERT WERKE Gmbh & CO. KG, Ingelfingen (DE)

(72) Inventor: Florian Fischer, Ingelfingen (DE)

(73) Assignee: BUERKERT WERKE GmbH & CO. KG, Ingelfingen (DE)

(*) Notice: Subject to any disclaimer, the term of this patent is extended or adjusted under 35 U.S.C. 154(b) by 757 days.

(21) Appl. No.: 17/453,283

(22) Filed: Nov. 2, 2021

(65) Prior Publication Data

US 2022/0134253 A1 May 5, 2022

(30) Foreign Application Priority Data

Nov. 4, 2020 (DE) .................. 10 2020 129 050.0

(51) Int. Cl.
*G01N 30/34* (2006.01)
*B01D 15/14* (2006.01)
*G01N 30/26* (2006.01)

(52) U.S. Cl.
CPC ............ *B01D 15/14* (2013.01); *G01N 30/26* (2013.01); *G01N 2030/347* (2013.01)

(58) Field of Classification Search
CPC ............................................. G01N 2030/347
USPC ......... 366/162.4, 165.4, 182.4; 137/897, 606
See application file for complete search history.

(56) References Cited

U.S. PATENT DOCUMENTS

| | | | | |
|---|---|---|---|---|
| 3,460,717 A | * | 8/1969 | Thomas | A23G 9/282 366/162.4 |
| 4,163,523 A | * | 8/1979 | Vincent | B05B 12/14 222/144.5 |
| 4,427,298 A | * | 1/1984 | Fahy | G05D 11/132 366/132 |
| 7,293,910 B2 | * | 11/2007 | Bellasalma | B29B 7/7615 138/45 |
| 7,754,075 B2 | * | 7/2010 | Richardson | G01N 30/32 366/162.4 |
| 10,823,160 B1 | * | 11/2020 | Babcock | F04B 1/053 |
| 2007/0253281 A1 | * | 11/2007 | Radford | B01F 25/31425 366/173.1 |
| 2019/0383777 A1 | * | 12/2019 | Inoue | G01N 30/32 |
| 2021/0389285 A1 | | 12/2021 | Plachetka et al. | |

FOREIGN PATENT DOCUMENTS

CN 101721933 A 6/2010
DE 10 2020 115 737 A1 7/2020

* cited by examiner

*Primary Examiner* — David L Sorkin
(74) *Attorney, Agent, or Firm* — McNees Wallace & Nurick LLC

(57) ABSTRACT

A mixer system for a liquid chromatography system has a mixer block, a plurality of fluid inlets which are connected to a mixing chamber by a respective channel, and a fluid outlet for mixed fluid. Each channel has a valve assigned thereto which is adapted to control the fluid flow. An adapter which is attached to the mixer block and through which one of the channels passes is provided for each valve. The valve is attached to the appropriate adapter, and the valves are arranged in an annular shape around the mixer block.

14 Claims, 6 Drawing Sheets

MIXER SYSTEM FOR A LIQUID CHROMATOGRAPHY SYSTEM

FIELD OF THE INVENTION

The invention relates to a mixer system for a liquid chromatography system, comprising a mixer block, a plurality of fluid inlets which are connected to a mixing chamber by a respective channel, and an outlet for mixed fluid, each channel having a valve assigned thereto which is adapted to control the fluid flow.

BACKGROUND OF THE INVENTION

Such a mixer system is known from DE 10 2020 115 737 A1. It is used to mix different fluids together in a precisely controlled ratio. The fluid inlets are each assigned to a fluid, and the valves can be used to control the ratio in which the fluids are introduced into the mixing chamber, where they then mix with each other.

With the known mixer system, it has been found that the dimensions are comparatively large.

Therefore, the object of the invention is to create a mixer system which is particularly compact.

SUMMARY OF THE INVENTION

The invention provides an adapter which is attached to the mixer block and through which one of the channels passes is provided for each valve, the valve being attached to the corresponding adapter, and the valves being arranged in an annular shape around the mixer block. The invention is based on the realization that the advantage resulting from the use of the adapter, namely greater degrees of freedom in arranging the valves, outweighs the disadvantages which inevitably result from the use of the adapter compared with attaching the valves directly to the mixer block, namely an extension of the channels, an increase in the number of components and actually also an increase in volume due to the additional components. In the prior art, the valves are mounted directly on one of the outer surfaces of the mixer block so as to protrude from the mixer block. In a mixer block having a plurality of side faces to which the valves are attached, the valves in the prior art protrude "radially" outwards. This results in a generally very high installation space requirement. With the adapters provided according to the invention, it is possible to "rotate" the orientation of the valves so that they can be arranged in a ring or chain shape around the mixer block. This results in a particularly compact design.

According to a configuration of the invention, it is provided that the fluid inlets are arranged on the mixer block. This results in the fluid inlets together with the fluid outlet being arranged very close to each other, so that a compact connection pattern can be realized.

According to an alternative configuration, it is provided that a fluid inlet is arranged on each adapter. This makes it possible to use a standardized mixer block, which can then be adapted to different connection patterns by means of differently designed adapters.

According to a configuration, the mixer block has a plurality of side faces, each adapter being arranged on one of the side faces. This makes it possible to obtain a symmetrical structure in which the channels have the same length for each fluid to be mixed.

Depending on the available installation space, it may be provided that the adapter extends obliquely to the corresponding side face or parallel to one of the side faces.

Preferably, the valve is oriented perpendicularly to the plane in which the adapter extends. This allows the corresponding valve to be mounted in a flat manner against a side face of the adapter, thereby minimizing the assembly effort.

The valve preferably extends parallel to an adjacent adapter of an adjacent valve to achieve a compact design, so that as little clearance as possible remains between the adapter and the valve.

With regard to a low overall height, it may be provided that the valve has the shape of a flat cuboid and that the plane in which the cuboid extends is aligned perpendicularly to the plane in which the adjacent adapter extends. In other words, the valves are arranged in a tilted manner, which reduces the installation space required in one direction. With a view to a modular structure, each adapter and each valve are attached in a detachable manner, i.e. the adapters are detachably attached to the mixer block, and the valves are detachably attached to the corresponding adapter.

Preferably, the mixer block and/or the adapters are injection molded so that the components can be manufactured in high quantities at low cost but with high precision.

BRIEF DESCRIPTION OF THE DRAWINGS

The invention is described below with reference to various embodiments which are illustrated in the accompanying drawings, in which:

FIG. 5b shows a section along the plane V-V of FIG. 5a;

FIG. 6b shows a section along the plane VI-VI of FIG. 6a;

DETAILED DESCRIPTION OF THE INVENTION

Figure 1:
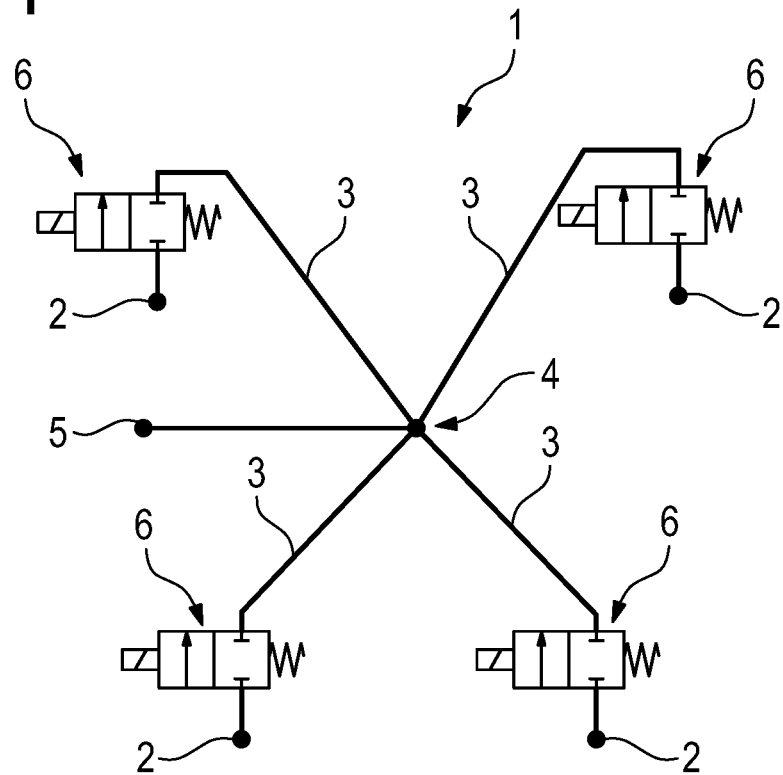
FIG. 1 shows a schematic circuit diagram of the mixer system.

FIG. 1 shows a circuit diagram of a mixer system 1 which is used to mix four different fluids with each other. A fluid inlet 2 which is connected to a mixing chamber 4 via a channel 3 is provided for each fluid. The mixed fluid exits the mixing chamber 4 via a fluid outlet 5. Each channel 3 has a valve 6 assigned thereto by means of which the flow through the channel 3 can be controlled or regulated.

Preferably, the valves 6 are solenoid valves.

FIGS. 2 to 6b show a first embodiment of the mixer system 1. The mixing chamber 4 is formed in a mixer block 10, which is also provided with the fluid outlet 5.

Figure 2:
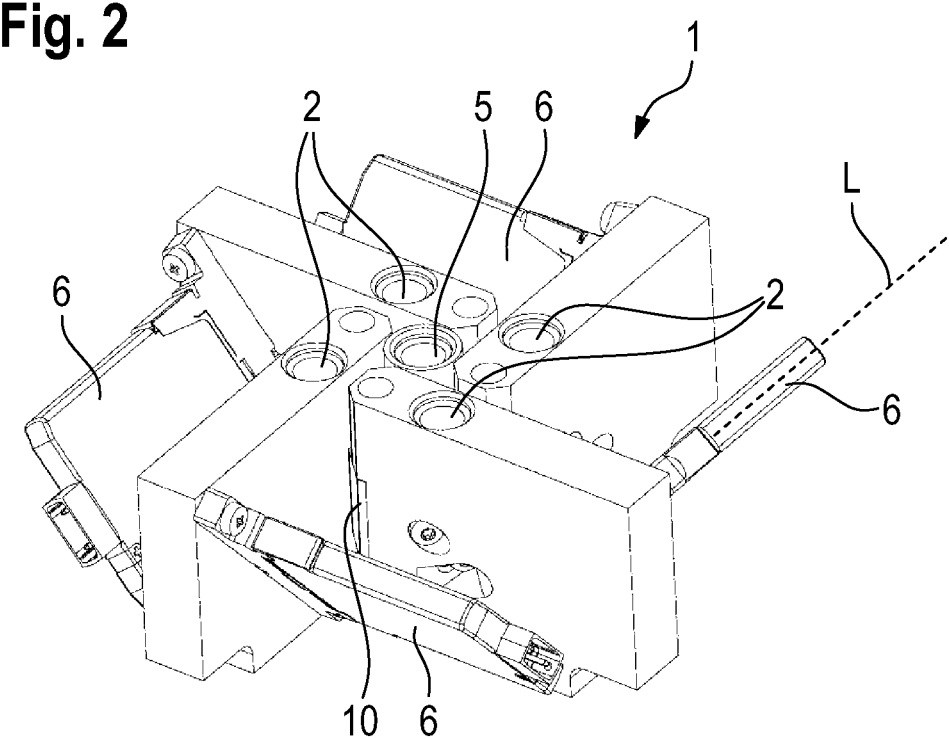
FIG. 2 shows a first embodiment of a mixer system according to the invention in a perspective view.

The mixer block 10 is designed here in the shape of a cuboid or a cube, wherein, for ease of understanding, reference is made hereafter to the reference system used in FIG. 2, in which the mixer block 10 rests with its underside on a base, the fluid outlet extends vertically upwards from its upper side, and the mixer block has a plurality of side faces 12, which respectively extend in vertical planes.

Figure 5A:
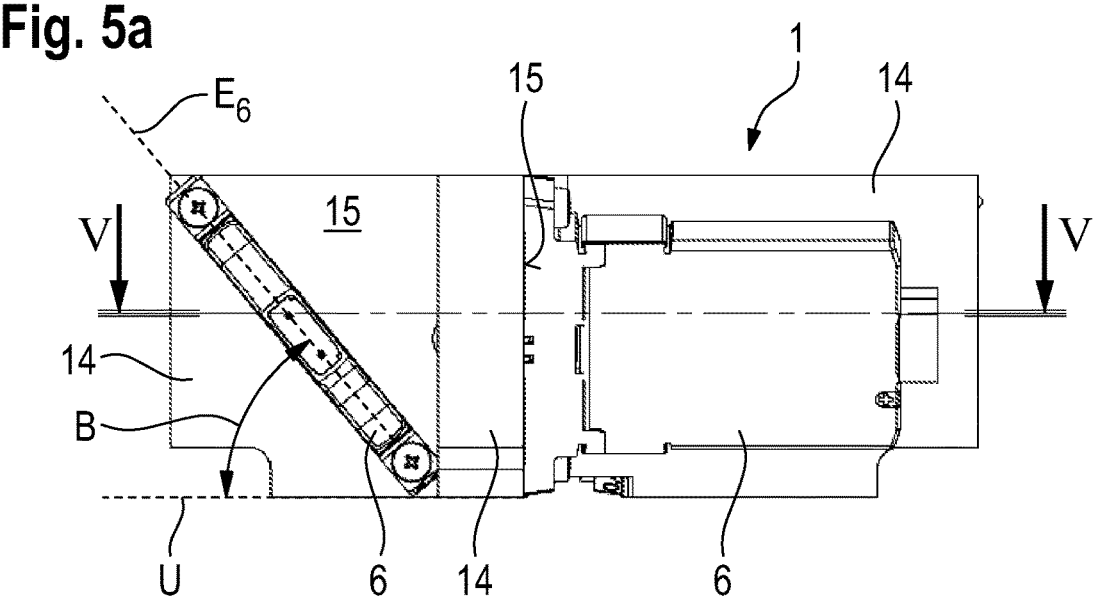
FIG. 5a shows a side view of the mixer system of FIG. 2.
Figure 5B:
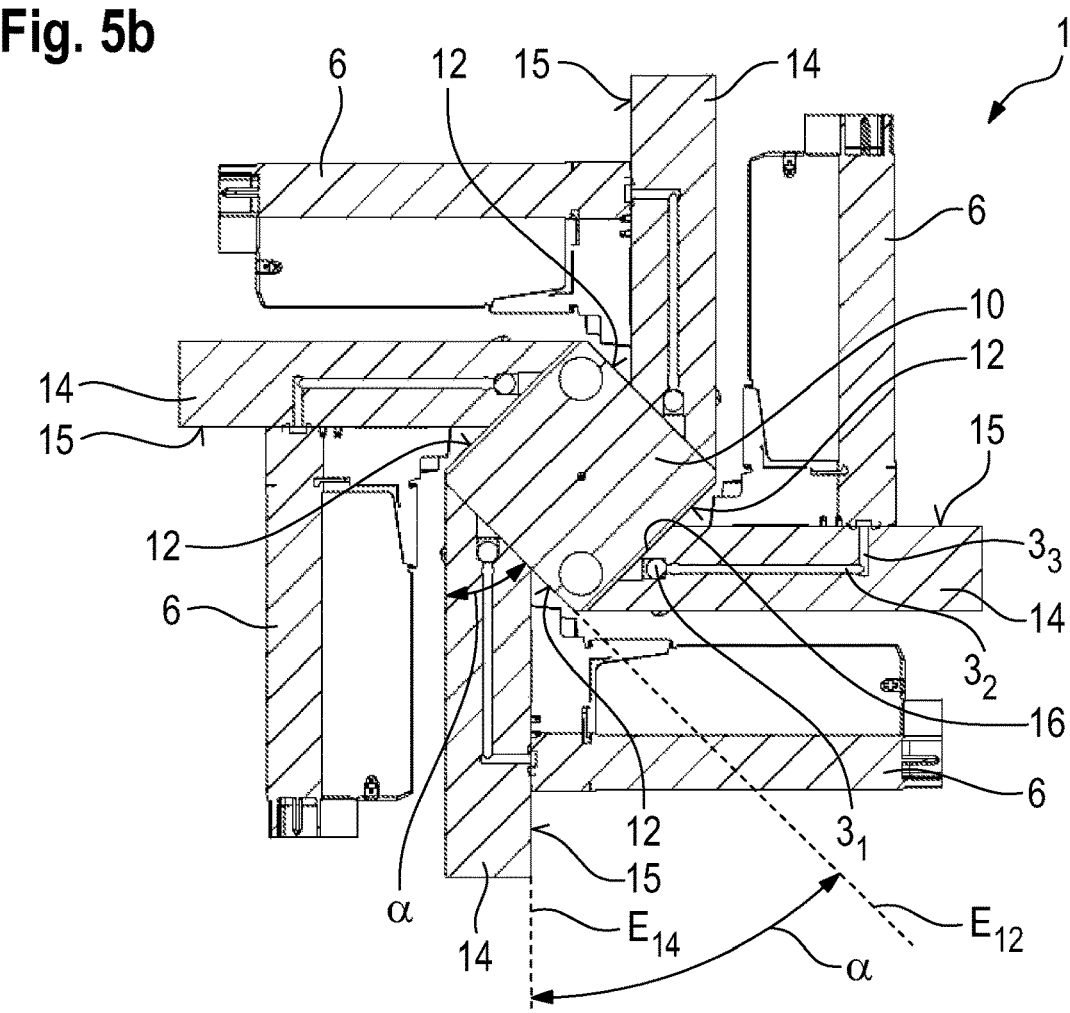
Figure 6A:
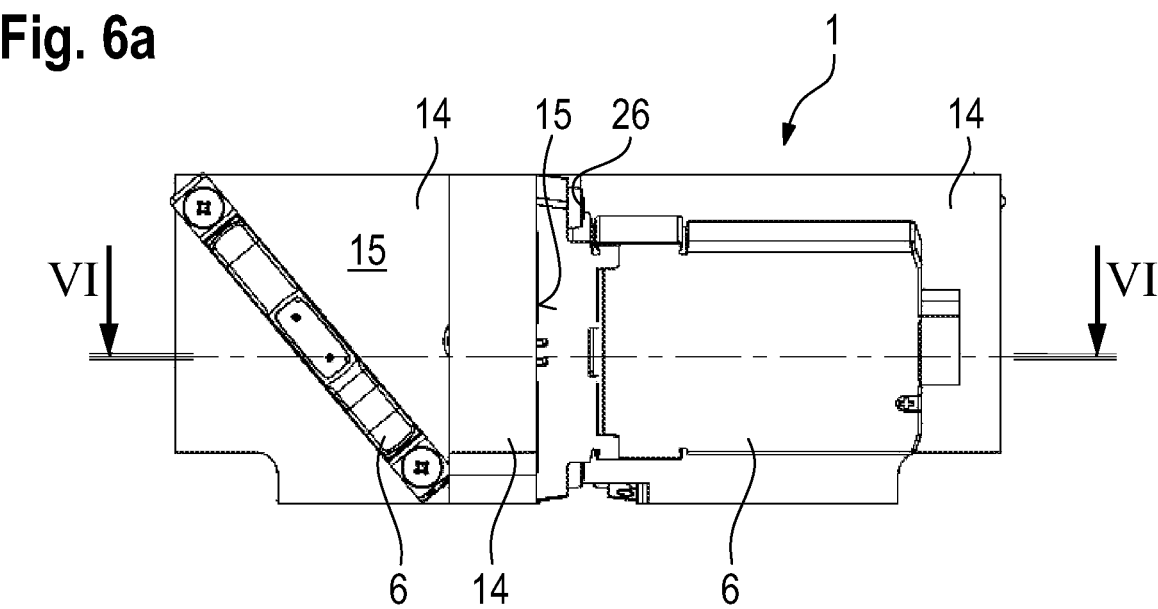
FIG. 6a shows a further side view of the mixer system of FIG. 1.
Figure 6B:
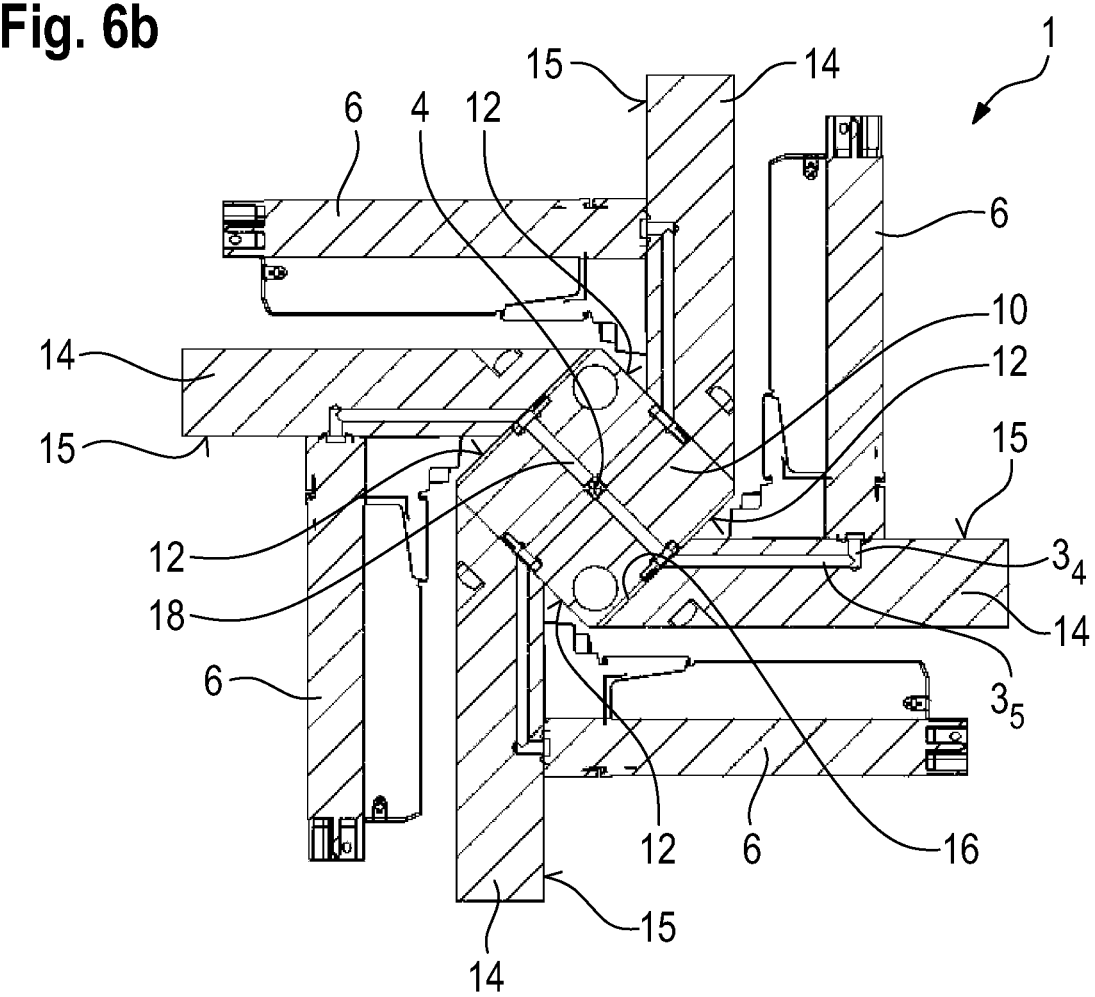

In the example embodiment shown, the mixer block has a square shape in a horizontal cross-section (see FIGS. 5b and 6b).

The valves 6 are not directly attached to the mixer block 10; rather, each valve 6 is attached to an adapter 14, which in turn is attached to the mixer block 10.

In the first embodiment, each adapter 14 is provided with a fluid inlet 2 (see FIGS. 2, 3, 4) from which a vertical section $3_1$ initially extends downwards. The vertical section $3_1$ opens into a horizontal section $3_2$ (see in particular FIG. 5b) which extends inside the adapter away from the mixer block 10. The horizontal section $3_2$ is adjoined by a valve inlet section $3_3$, which also extends horizontally and opens onto a side wall 15 of the corresponding adapter 14 (see FIG. 3).

The channel 3 then continues by means of a horizontally extending valve outlet section $3_4$, which starts from the exterior side of the adapter 14, where the valve inlet section $3_3$ also opens. The valve outlet section $3_4$ then merges into a section $3_5$, which also runs horizontally and extends towards the mixer block 10. There, it opens out at an abutment surface 16 of the adapter, which rests against the side face 12 of the mixer block 10.

A respective valve 6 is arranged on the side wall 15 of the adapter 14, on which the channel section $3_3$ opens out and from which the channel section $3_4$ departs, more specifically such that the valve defines the flow path and opens or closes it depending on its state.

Starting from the side faces of the mixer block 10, feed channels 18 extend into the mixer block 10, which then meet in the mixing chamber 4.

Briefly summarized, fluid supplied via the fluid inlets 2 flows through the channel sections $3_1$, $3_2$ and $3_3$ towards a side face of the adapter 14, from where the fluid channel continues through the corresponding valve 6. There, the flow cross-section can be opened and closed in a predetermined manner. Starting from the valve 6, the flow path then continues through the channel sections $3_4$, $3_5$ and the feed channel 18 to the mixing chamber 4, and from there to the fluid outlet 5.

As can be seen in particular in FIG. 5b, the adapters 14 are obliquely placed on the side faces 12 of the mixer block 10 such that a plane defined by the plate-shaped adapter 14 extends at an angle α relative to the plane defined by the side face 12. In FIG. 5b, the plane $E_{14}$ and the plane $E_{12}$ as well as the angle α are exemplarily drawn for an adapter.

In the example embodiment shown, the angle α is approximately 45 degrees.

The angle α also corresponds to the angle at which the abutment surface 16 of the adapter 14 extends relative to the exterior side.

Figure 3:
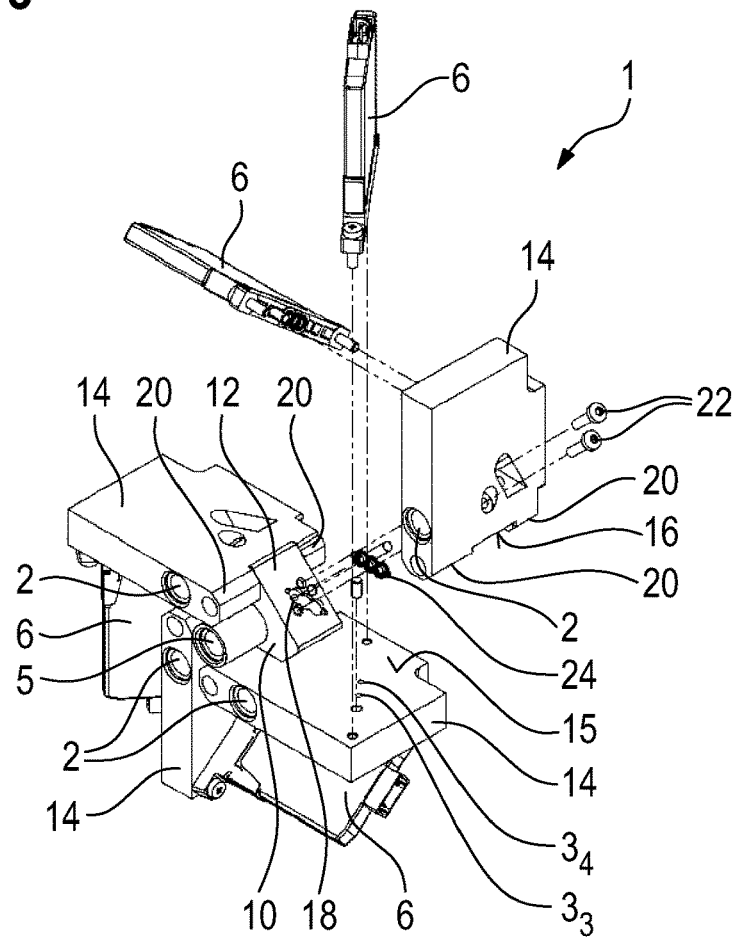
FIG. 3 shows an exploded view of the mixer system of FIG. 2.

As can be seen in particular in FIG. 3, the adapter 14 has protruding material sections 20 on both sides of the obliquely extending abutment surface 16, which are arranged above and below the upper side and the lower side of the mixer block. This improves the guidance in the vertical direction.

Each adapter 14 is detachably attached to the corresponding side face 12 of the mixer block 10. In the example embodiment shown, two screws 22 are here provided for each adapter 14.

The screws 22 extend obliquely through the corresponding adapter so as to be aligned perpendicularly to the abutment surface 16 of the corresponding adapter 14 and to the side face 12 of the mixer block 10. This presses the mouth of the channel section $3_3$ perpendicularly onto the mouth of the feed channel 18.

A suitable seal 24 is respectively provided in the area of the interface between the abutment surface 16 of the adapter 14 and the side face 12. The seal can be designed as a sealing ring.

The seal 24 consists of a material that is resistant to the fluids used. It is for example possible to use FFKM.

The valves 6 are attached to the side wall 15 on which the channel sections $3_3$ and $3_4$ open, so as to seal the fluid channel. Suitable seals can again be used for this purpose.

As can be seen in particular in FIG. 2, the valves 6 are attached to the side walls 15 such that the longitudinal direction L thereof, which is drawn here as an example for a valve 6, extends perpendicularly to the plane of the side wall 15.

Screws 26 can respectively be used to attach the valves 6 to the adapters 14.

As can be seen in particular in FIGS. 2 and 5a, the valves 6, which are cuboid-shaped, are arranged so as to be obliquely tilted. A plane $E_6$ defined by the cuboid body is arranged at an angle β relative to the plane U of the base (horizontal plane) of the mixer system 1. The angle β is then >0 and <90 degrees. In the example embodiment shown, it is about 45 degrees.

It can be seen that due to the oblique position of the valves 6, the height of the mixer system 1 is lower than in case of an arrangement of the valves with an angle β of 90 degrees.

Figure 4:
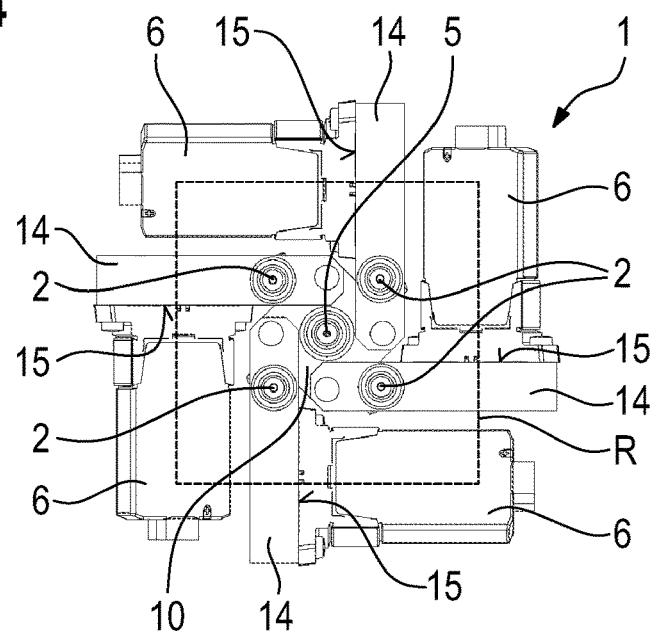
FIG. 4 shows a top view of the mixer system of FIG. 2.

In the top view of FIG. 4, it can in particular be seen that the valves 6 are arranged in a ring or a frame around the mixer block 10. For clarification, the frame R, which is formed by the center axes of the valves 6, is shown here as a dashed line.

FIG. 4 also illustrates why the mixer system 1 is generally very compact, though there are additional components, namely the adapters 14, compared to a design in which the valves are placed directly on the side faces of the mixer block. There is very little free space overall which remains between the individual valves 6 or the valve and the adjacent adapter.

Due to the tilted configuration, a very low overall height is furthermore achieved.

Figure 7:
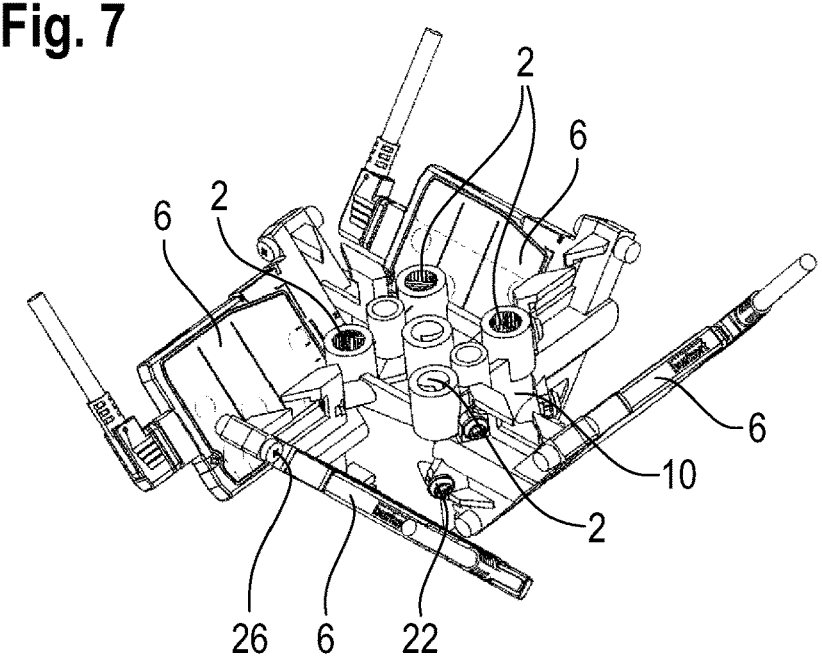
FIG. 7 shows a perspective view of a mixer system according to a second embodiment of the invention.
Figure 8:
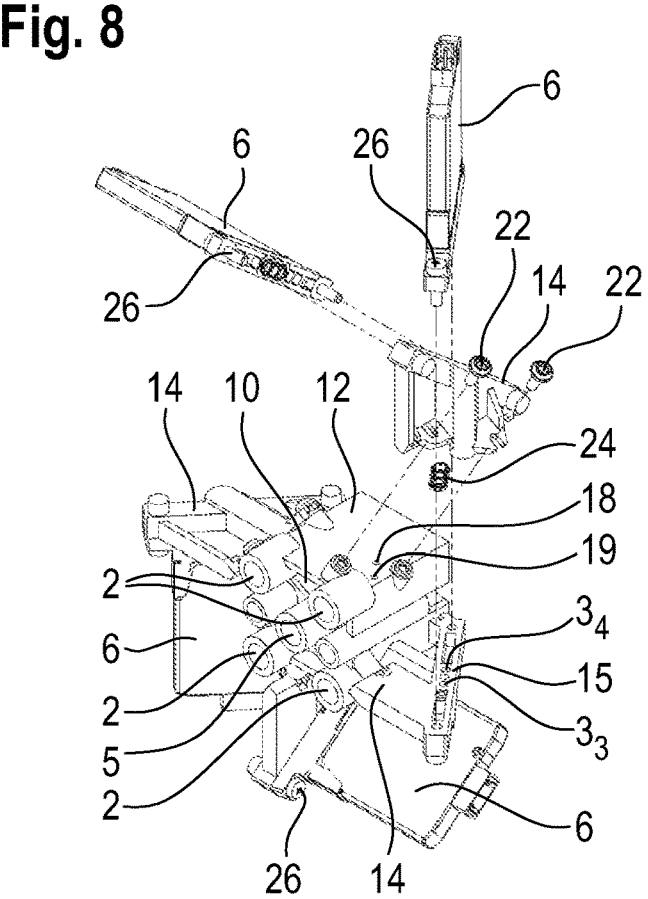
FIG. 8 shows an exploded view of the mixer system of FIG. 7.
Figure 9:
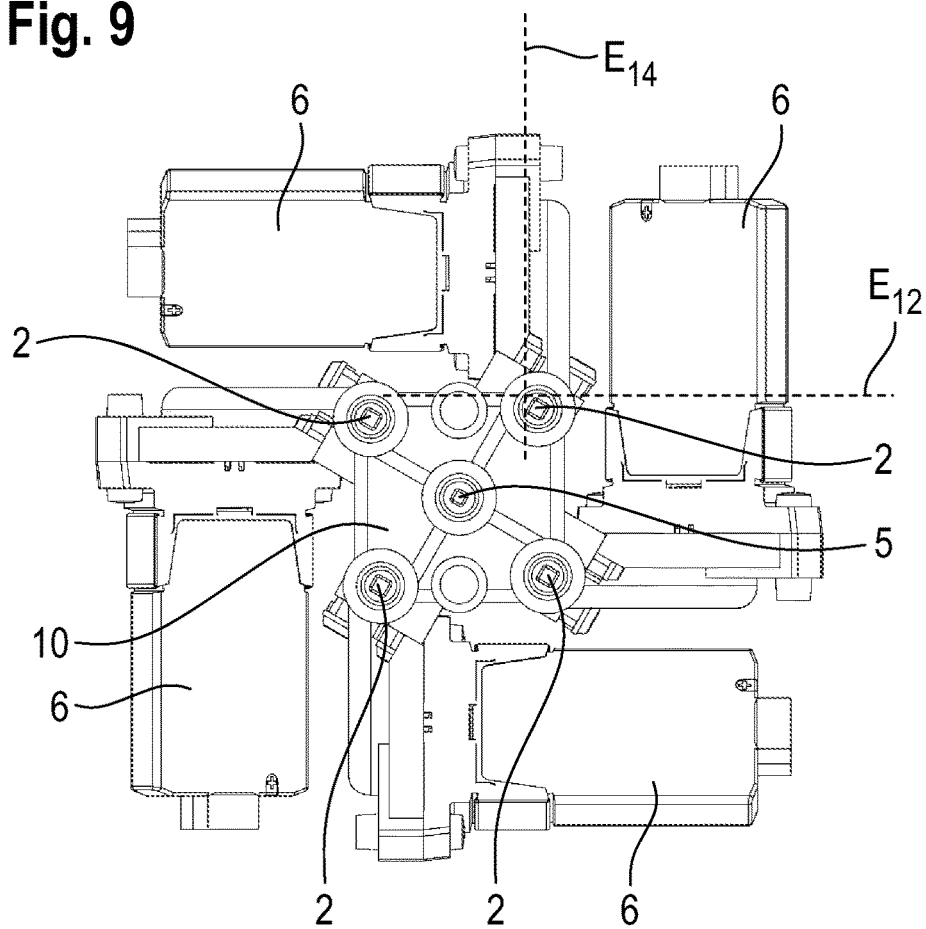
FIG. 9 shows a top view of the mixer system of FIG. 7.

FIGS. 7 to 9 show a second embodiment of the mixer system. The same reference numerals are used for the components known from the previous embodiment, and in this respect, reference is made to the above explanations.

The main difference between the first and the second embodiment is that in the second embodiment, the fluid inlets 2 are not provided on the adapters 14, as in the first embodiment, but are arranged on the mixer block 10. Accordingly, there are two connection openings towards the corresponding adapter 14 on each side face 12 of the mixer block 10, namely an inflow opening 19 and the return opening 18.

A further difference is the orientation of the adapters 14. As can be seen in particular in FIG. 9, the plane $E_{14}$ in which they extend is perpendicular to the plane $E_{12}$ of the side faces 12 of the mixer block 10.

The adapters 14 are not arranged centrally on the side faces 12 of the mixer block 10, but in the region of the transition to the adjacent side face. Therefore, the valves 6 which are arranged perpendicularly to the plane of the adapters 14 as in the first embodiment, extend first along the side face 12 on which the corresponding adapter 14 is arranged, and then along the adapter 14 arranged on the adjacent side face 12. As can be seen in particular in FIG. 8, the adapters 14 are not substantially plate-shaped, as in the first embodiment, but have a very narrow mounting surface 15 instead of the side surface 15, to which the corresponding valve 6 is attached.

In the second embodiment, the valves 6 are also arranged tilted by an angle R. This results in a low overall height.

Figure 10:
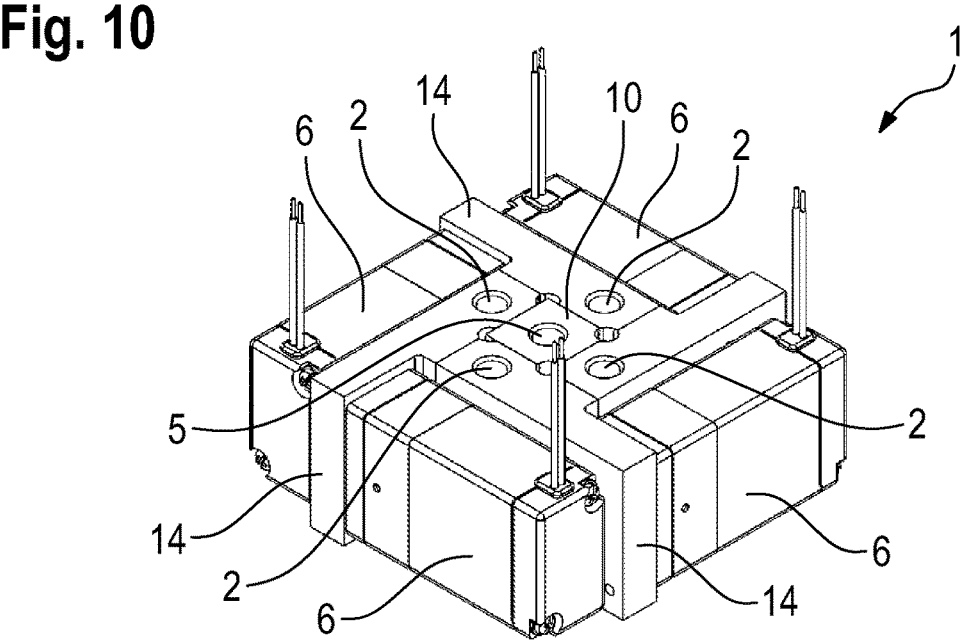
FIG. 10 shows a perspective view of a mixer system according to a third embodiment of the invention.

FIG. 10 shows a third embodiment. The same reference numerals are used for the components known from the previous embodiments, and in this respect, reference is made to the above explanations.

The essential difference between the third embodiment and the previous embodiments is that in the third embodiment, the valves 6 are not arranged tilted, but extend in a flat manner along the adapter 14 of the adjacent valve 6.

In the third embodiment, the fluid inlets 2 are again provided on the adapters 14 in the same way as in the first embodiment. It can be seen that with the adapters 14, it is possible to fasten the valves 6 even to a very small mixer block 10, a very compact design being obtained overall. As seen in a top view, a square design is obtained, in which the valves 6 are arranged along the outer edges of the square.

The mixer block 10 can be injection molded from a plastic material, just like the adapters 14. A suitable material is PEEK.

It is also possible to drill a part of the fluid channels and then to close them at the corner points, if necessary. For example, a ball made of PEEK can be pressed or also welded therein.

The invention claimed is:

1. A mixer system for a liquid chromatography system, comprising:
   a mixer block,
   a plurality of fluid inlets which are connected to a mixing chamber by a respective channel, and
   a fluid outlet for mixed fluid,
   wherein each channel has a valve assigned thereto which is adapted to control the fluid flow,
   wherein an adapter which is attached to the mixer block and through which one of the channels passes is provided for each valve, the valve being attached to the appropriate adapter, and the valves being arranged in an annular shape around the mixer block,
   wherein each adapter includes a side wall on which the valve is arranged,
   wherein a valve inlet section and a valve outlet section for the valve are formed in the adapter, and
   wherein the valve inlet section and the valve outlet section open onto the same side wall of the adapter on which the valve is arranged.

2. The mixer system of claim 1, wherein the fluid inlets are arranged on the mixer block.

3. The mixer system of claim 1, wherein a fluid inlet is arranged on each adapter.

4. The mixer system of claim 1, wherein the mixer block has a plurality of side faces and in that each adapter is attached to one of the side faces.

5. The mixer system of claim 4, wherein the adapter extends obliquely to the corresponding side face.

6. The mixer system of claim 4, wherein the adapter extends parallel to one of the side faces.

7. The mixer system of claim 1, wherein the valve is oriented perpendicularly to the plane in which the adapter extends.

8. The mixer system of claim 1, wherein each valve extends parallel to an adjacent adapter of an adjacent valve.

9. The mixer system of claim 1, wherein the valve has the shape of a flat cuboid and the plane which the cuboid extends is oriented obliquely to the plane in which the adjacent adapter extends.

10. The mixer system of claim 1, wherein each adapter is detachably fastened to the mixer block.

11. The mixer system of claim 1, wherein each valve is detachably fastened to the corresponding adapter.

12. The mixer system of claim 1, wherein at least one of the mixer block and the adapters are injection molded.

13. A mixer system for a liquid chromatography system, comprising:
    a mixer block,
    a plurality of fluid inlets which are connected to a mixing chamber by a respective channel, and
    a fluid outlet for mixed fluid,
    wherein each channel has a valve assigned thereto which is adapted to control the fluid flow,
    wherein an adapter which is attached to the mixer block and through which one of the channels passes is provided for each valve, the valve being attached to the appropriate adapter, and the valves being arranged in an annular shape around the mixer block,
    wherein the valves are not directly attached to the mixer block, but each valve is directly attached to an adapter which in turn is attached to the mixer block, and
    wherein the valves have the shape of a flat cuboid.

14. A mixer system for a liquid chromatography system, comprising:
    a mixer block,
    a plurality of fluid inlets which are connected to a mixing chamber by a respective channel, and
    a fluid outlet for mixed fluid, each channel having a valve assigned thereto which is adapted to control the fluid flow,
    wherein an adapter which is attached to the mixer block and through which one of the channels passes is provided for each valve, the valve being attached to the appropriate adapter, and the valves being arranged in an annular shape around the mixer block,
    wherein the mixer block has a plurality of side faces and each adapter is attached to one of the side faces, and
    wherein the adapter extends obliquely to the corresponding side face.

* * * * *